United States Patent Office 2,703,757
Patented Mar. 8, 1955

2,703,757

JELLY MAKING COMPOSITION

Herbert Thal Leo and Clarence C. Taylor, Anaheim, Calif.

No Drawing. Application July 5, 1951, Serial No. 235,376

4 Claims. (Cl. 99—132)

This invention relates to a jelly making composition, and more particularly to a household jelly making composition comprising a dry, granular, porous pectin that is itself insoluble in plain water, and that is ground to such a degree of coarseness that it will disperse readily in plain water, whether hot or cold. In the composition of our invention, such a pectin is admixed with an alkali metal salt of an organic oxy acid in an amount sufficient to effect complete dissolution of the pectin and with an amount of an organic oxy acid sufficient without further acid addition to enable said mixture to form a standard jelly when a concentrated solution of the mixture is added to the proper weight of sugar in a batch and the sugar content of the resulting solution is adjusted to at least 65% by weight.

It has heretofore been known that a dry pectin can be dispersed in water if a dispersing agent is used, as for instance sugar (Patent No. 1,646,157), or, where the pectin is itself strongly acid, an effervescent salt such as sodium bicarbonate (Re. 19,197). Where sugar is incorporated as the dispersing agent for the dry pectin, the resulting mixture is necessarily bulky and relatively expensive to ship. In pectin mixtures containing sodium bicarbonate, where gas formation is depended upon for dispersing, one disadvantage is the destruction of the pectin due to close contact with the relatively alkaline bicarbonate (pH 8 to 11) and the resulting formation of sodium pectate.

All dry pectins heretofore commercially produced have been ground to 80 mesh and finer so that once they are dispersed in water, they will dissolve rapidly. When ground to that degree of fineness, however, the powdered pectins required special dispersing agents such as described because they would otherwise lump badly when added to water. This is due to the occlusion of air on the surfaces of the powdered pectin, causing the powder, if fine enough, to float, or, if stirred under the surface of the water, to agglomerate into lumps that have dry interiors to which the water will not penetrate readily.

One suggested solution of this problem of dispersing finely ground pectin has been to coat the individual pectin particles with a surface film of a metal pectinate (Patent No. 2,261,858). Such coated pectin if of a particle size of 80 to 200 mesh is said to be soluble and readily dispersible in cold water. However, the method employed requires an extra step that adds to the cost of production.

We have now found that if, instead of grinding to 80 mesh and finer, the pectin is ground to a mesh coarser than customary, such as between 30 and 80 mesh, the pectin sinks quickly beneath the surface of the water like sand when stirred into plain water, disperses readily and does not tend to lump at any time. This is particularly true if pectins of less than 100 mesh are used that are not soluble in plain water either hot or cold. Such pectins can be made by the processes described in Patents Nos. 2,392,854 and 2,425,947. On the other hand, even such non-water soluble pectins, if ground to finer than 100 mesh, tend to lump when added to water.

As taught in Patent No. 2,392,854, an edible alkali metal salt of an organic oxy acid, such as sodium citrate, sodium tartrate, and corresponding potassium salts, will aid in effecting the solution of a non-water soluble pectin such as therein described. In our present composition, we utilize a sufficient amount of such a salt not to effect dispersion of the pectin, since the coarse grinding accomplishes that, but to effect complete solution of the otherwise non-water soluble pectin after it has been dispersed.

We also incorporate a free organic oxy acid into the mixture of the non-water soluble pectin and solubilizing agent. While any of the solid edible organic oxy acids, such as citric, tartaric, or malic may be used, we have found that tartaric acid is the only one that gives a dry composition that is non-caking when packaged in non-hermetically sealed containers, such as paper envelopes, under the highly humid conditions that occur during storage. Tartaric acid is therefore preferred where the composition is likely to be stored or kept in paper envelopes on shelves for a long period of time.

Actually, it was wholly unexpected that any substantial amount of free acid could be incorporated in a dry mixture of pectin and a solubilizing agent, because if the acid and solubilizing agent went into solution first, such solution would cause the pectin to lump and prevent its complete dispersion. This would be true even in the case of the non-water soluble, porous pectin that we use if it were ground to the heretofore fineness of 80 mesh and finer, but where it is coarser than 80 mesh, it disperses so rapidly in plain water and even in any solution, already formed of the acid and solubilizing agent, that it does not lump. Also, to prevent a higher rate of dissolution of the acid and solubilizing agent than dispersion of the pectin we use a granular form of both the acid and the solubilizing agent. Practically, they are of substantially the same particle size as that of the pectin so that there may be no tendency of any ingredient to segregate out when standing after being mixed.

We are therefore able in our jelly making composition to incorporate a sufficient amount of a solid granular acid, such as tartaric, to supply all of the acid required for the subsequent jelly making operation, without relying upon the acidity of the fruit and without adding other acid to the jelly batch. This contributes to a more "fool-proof" jelly making operation when our composition is used.

Our jelly making composition is further distinguished from any heretofore known in that the composition as a whole has a jelly grade of over 50 and preferably between 100 and 150. This requires that the starting pectin be at least 200 grade, and 250 grade pectin is preferable. The amount of inert material, such as dextrose, used to standardize the final jelly making composition to a jelly grade of between 50 and 150 is thus only sufficient for that purpose and is not added because of any pectin dispersing function that it may have.

Any pectin that is non-water soluble in plain water, both hot and cold, and that is of at least 200 grade may be used, whether of high methoxy content or partially demethoxylated. Apple pectins are not naturally demethoxylated, whereas citrus pectins usually are partially demethoxylated due to the presence of pectase in the natural citrus fruit and the unavoidable demethoxylation caused thereby in nature and in processing before the action of the pectase is inhibited or destroyed and the pectin recovered. Since demethoxylated pectins are calcium susceptible, the greater the extent to which the pectin has been pectase-reacted, the less soluble the pectin is in acid alone. However, even a partially demethoxylated citrus pectin, or pectinic acid, in our composition is rendered completely water soluble by the amount of the alkali metal salt of an organic oxy acid, such as sodium citrate, that is present therein. The sodium citrate, or its equivalent in the form of an edible alkali metal salt of another organic oxy acid, is present in our composition in an amount sufficient not only to dissolve any aluminum hydroxide, or other metal hydroxide or oxide, in the pectin but also to buffer the resulting water solution of the composition to a sufficiently high pH value to put any partially demethoxylated pectin into solution. The proportions of pectin, acid and salt in our composition are such that a water solution thereof made up for jelly making in accordance with our method will have a pH value within the range of from 2.20 to 4.00 and preferably between 2.50 and 3.00.

In using our composition in the making of jellies, the dry, granular mixture consisting essentially of non-water soluble porous pectin of 10 to 100 mesh, and preferably 30 to 80 mesh, sodium citrate, or its equivalent, and a free organic oxy acid, preferably tartaric acid, all of substantially the same particle size, is first completely dissolved in a relatively small quantity of plain water. Cold water may be used, but hot water is preferred because of the shorter length of time required for complete solution. In hot water, that is, water at a temperature of 180° F. to 212° F., the time required for complete solution is less than five minutes if the mass is constantly stirred.

The solution of our composition is then ready for use in the making of jelly, jam or the like. Since the best reason for putting out a household pectin is to insure the making of a successful jelly, the "fool-proof" character of our composition is a paramount object. In making jelly with our composition, the housewife may add the solution of our composition to the water or fruit juice in the kettle before adding the required sugar or to the water or fruit juice in the kettle after the sugar has been dissolved therein. In other words, there is no special sequence required. Whatever the sequence followed, the operator cannot fail to make a satisfactory, firm jelly if she first makes a complete solution of our jelly making composition, incorporates the solution into a batch containing the amount of sugar corresponding to the weight and jelly grade of the pectin in the dry composition used, and then brings the resulting mass in the kettle to at least a 65% sugar content by weight. No further amount of acid is required, nor is it necessary to depend upon oxy acids or salts of oxy acids that may be in the fruit or fruit juices in the kettle. An aqueous solution of sugar alone, with no fruit or fruit juices, can be caused to jell with equal ease and certainty.

In making up our composition, we prefer to start with a pectin that has been precipitated from a pectin extract made from citrus fruit, by the addition thereto of a soluble aluminum salt and by the proper control of the pH to bring about a co-precipitation of pectin and aluminum hydroxide as a pectin-aluminum complex. This complex comes out of solution as a curd, which is dropped into 40% alcohol to harden it. After being hardened, the co-precipitate can be easily broken up into small pieces.

The broken up pectin-aluminum complex is then washed with acidified alcohol to remove more or less of the aluminum present as $Al(OH)_3$. A sufficient amount of acidified alcohol having a pH between 0.5 and 2.0 is used to reduce the aluminum content of the pectin to a point at which the pectin still is not soluble but will disperse readily in plain water, either hot or cold, when of a particle size between 30 and 80 mesh. This property of dispersibility, as previously pointed out, is due first, to the water insolubility of the pectin and secondly, to the coarser particle size, to which we intentionally grind our pectin. The pectin is inherently of a porous character when prepared from a pectin-aluminum complex in the manner described.

After the last acidified alcohol wash, the pectin is brought to a somewhat higher pH, say, to around a pH value of 3.30 by the addition of ammonia to the final alcohol rinse. Thereafter, the washed, porous pectin is ground to a relatively coarse size, screened to collect all particles between about 30 and 80 mesh, and the coarser particles reground and rescreened. Anything finer than about 100 mesh is separated for a different use. The result is a non-water soluble pectin in granular form of a particle size less than 100 mesh and substantially all between 30 and 80 mesh. While a coarser grind, down as low as 10 mesh, can be used, it is preferable to employ a particle size that is free of any substantial proportion of fines above 100 mesh.

Since, to the best of our knowledge, there is no standard or accepted test for determining the fact that a given pectin is completely in solution, or is soluble or not soluble in plain water, we are giving below tests that we use. In general, if a pectin is completely in solution, the solution is substantially clear and when poured slowly will form a continuous, clear stream tapering progressively from the pouring source to almost hair-like thinness without breaking its continuity. We term this "stringing." A pectin that is not completely water soluble may appear to dissolve in water but will not "string" to give the continuous fine stream on slow pouring. Further, it will impart a pearl-like appearance to a mass of water into which it has been stirred, and a pebbly appearance in thin films, such as those formed during stirring on the wall of the beaker or glass container. In stating herein that our jelly making composition completely dissolves in hot water (180° to 212° F.) within five minutes to give a solution of at least 6¼ jelly grade, we judge completion of solution in accordance with the above. When the solution is substantially clear, except for air bubbles, is free from a pearl-like appearance when viewed as a mass, or a pebbly appearance when viewed in thin films, and gives a stream tapering to hair-like thinness, it is considered to be in complete solution.

While an experienced jelly maker can judge by physical manifestations, such as the above, whether a pectin is in solution or not, the test for solubility that we have devised is positive and definite, in that it is based upon the ability or inability of the given pectin to make a jell. Obviously, if the pectin will make a satisfactory firm jell under standardized conditions, it has been put into solution and is therefore soluble, whereas, if it does not make a jell under those same conditions, it has not dissolved and is not soluble. The following is our test for the solubility:

*Solubility test*

28.4 grams of 100 grade pectin, or an equivalent weight of a higher grade pectin are added to a pint of hot plain water. Two such pint lots are separately prepared and stirred in a Waring blender for a couple of minutes, but to lot (1) no addition is made while to lot (2) are added 1.4 grams of tartaric acid and 1.4 grams of sodium citrate, while stirring. 125 grams each of lots (1) and (2) are then added to separate but identical hot batches of sugar and water in kettles, each consisting of 500 grams of sugar and 170 ml. of water. After boiling to exactly 777 grams to give a 65% sugar content, each batch is tested for quality of jelly by pouring from the kettles into 6 ounce jelly jars, two of which contain 2 cc. of 50% tartaric acid solution to give a finished jelly of about 2.50 pH, and two of which contain 2 cc. of 50% citric acid solution and 0.5 cc. of 25% sodium citrate solution to give a finished jelly of about 3.0 pH.

If under these conditions lot (1) does not form a satisfactory firm jelly in either of the jars into which it is poured, whereas lot (2) does, then the pectin tested is a non-water soluble pectin within the meaning of the term as used herein, and is satisfactory for our purposes. If boths lots give equally satisfactory firm jellies, then the pectin tested is water soluble and is not suitable for use in our composition.

The following examples will serve to illustrate jelly making compositions coming within the scope of our invention. Percentages are expressed in percentages by weight.

Example I—100 grade:
 40%—30 to 80 mesh, 250-grade pectin
 30%—U. S. P. granular tartaric acid
 10%—U. S. P. granular sodium citrate
 20%—hydrous dextrose

100%

This mixture becomes a 100 grade. It contains enough sodium citrate to dissolve the pectin within five minutes when the dry mixture is added in the proportion of ½ ounce of the mixture to 8 fluid ounces of hot water (180° F. to 212° F.). The pH of the resulting solution is between 2.50 and 2.75.

One advantage of this mixture is that it is free flowing and remains so even after being exposed to high relative humidities. If this particular advantage is not required for one reason or another, citric acid can be substituted for tartaric acid in its equivalent proportion of 40% in place of the 30% of tartaric acid.

Example II—50 grade:
 20%—30 to 80 mesh, 250 grade pectin
 15%—U. S. P. granular tartaric acid
 5%—U. S. P. granular sodium citrate
 60%—dextrose

100%

This mixture becomes a 50 grade pectin. The properties are otherwise similar to the composition of Example I, except that twice the quantity is required to jell the same weight of sugar.

Example III—150 grade:
- 55%—30 to 80 mesh, 270 grade pectin
- 33%—U. S. P. granular tartaric acid
- 12%—U. S. P. granular sodium citrate

100%

In any of the foregoing examples the pectin may be a pectin prepared from a pectin-aluminum complex by washing with an acidified alcohol at a pH of between 0.5 and 2.0 until substantial equilibrium is reached. Where, after being so washed with the acidified alcohol, the pectin is rinsed to a pH of about 2.50 with alcohol and then partially neutralized to a pH of about 3.30 by the use of ammonia, the pectin will invariably be one that according to our solubility test is non-water soluble. Other pectins produced by precipitation as a complex of aluminum, iron, copper or other polyvalent metal will likewise fall in to the category of non-water soluble pectins, although if they are washed with acidified alcohol of less than 1.0 pH for a sufficient length of time and then rinsed with an alcohol containing a sodium lactate, to raise the pH of the pectin to 3.0 or above, the resulting pectin may or may not be a water soluble pectin by our test for solubility. If it proves to be water soluble, it is not suitable for our purposes.

Our composition is primarily for the making of jellies and jams by the housewife. It contains in admixture all of the ingredients that are essential, except the sugar, for good jelly and jam making. If the sugar content of the batch used in jelly or jam making, after the addition of a solution of our admixture to the batch is made, is adjusted to at least 65% by weight of the batch, a good firm jelly or jam must result, regardless of the acid or alkali metal salt content of the fruit or fruit juice, or other flavoring material used in making up the batch. The secret of the "fool-proof" character of our composition for jelly making is that when dissolved—and a complete solution of our composition must be made up first before use in the jelly making operation—such solution of itself provides an excess of solubilizing agent for the pectin if the pectin should be calcium susceptible or if the water used in dissolving the composition in the making of the jelly should have a high calcium hardness; and the resulting solution then provides an excess of acid over that necessary for jelly making even if the fruit or flavoring material to which it may be added is wholly devoid of acid. The solubilizing agent used prevents the solution of our composition from jellifying before use.

The ease with which our pectin composition goes into complete solution is due first, to the insoluble and porous character of the pectin itself and to the coarseness of particle size, all of which insure rapid dispersion and, secondly, to the presence of a sufficient amount of a solubilizing agent, the alkali metal organic oxy acid salt, to insure complete solution of the pectin very rapidly and always within five minutes if hot water is used for dissolving. The porosity of the pectin particle also aids in its dissolution, since solution on the inside as well as on the outside of the particle can take place simultaneously if the particles are dispersed, that is, are separated as discrete units in the water. Once a complete solution of the pectin has been made, there is hardly anything that the operator can subsequently do, knowingly or unknowingly, in the jelly making operation that will prevent her from making a satisfactory jelly or jam.

Never previously, to our knowledge, has there been available to the housewife a dry pectin composition so versatile, of such high jelly grade value, or so unfailingly capable of making a satisfactory jelly as our composition. From a marketability standpoint, our dry 100-grade pectin composition has great utility and presents great savings. As contrasted with any liquid pectin on the market, one-half ounce of our composition is the equivalent in jelly unit values of eight ounces of the liquid pectin, as such, and if the weight of the glass container is included, is equivalent to 19 ounces of bottled liquid pectin. Also, any commercial liquid pectin is perishable because it is a liquid; it deteriorates in a matter of months; it freezes; and it presents a risk of breakage of the glass container and loss by spillage.

In order to show the differences between the jelly making composition of our invention and other compositions now on the market, samples of all readily available compositions were tested for comparison as to jelly making characteristics. The following five samples were tested. No. 1 was a ½ oz. sample of our composition, comprising 40% non-water soluble porous pectin, 30–80 mesh, 250 grade, 30% tartaric acid, 10% sodium citrate and 20% hydrous dextrose; No. 2 (2½ oz.) "Pen-Jel"; No. 3 (3½ oz.) "M. C. P."; No. 4 (2½ oz.) "Sure-Jell," and No. 5, (8 oz.) "Certo."

| Jelly units | Fluid oz. of water to which added | Percent solids in solution | Jelly grade of solution | pH of sol'n. | Percent acid as citric acid |
|---|---|---|---|---|---|
| 50 grade | 8 | 6.0 | 6¼ | 2.70 | 1.9 |
| 32½ grade | 5¼ | 28.5 | 6¼ | 2.15 | 1.96 |
| 35 grade | 5½ | 33.8 | 6¼ | 2.15 | 1.89 |
| 32½ grade | 5¼ | 28.7 | 6¼ | 2.10 | 3.44 |
| 50 grade | as is | 9.3 | 6¼ | 2.90 | 1.96 |

Each of samples Nos. 1 to 4, inclusive, was separately added to the above specified amounts of hot plain water to make up a solution equivalent to 6¼ jelly grade. Each solution so made up was then added to separate kettles containing identical weights of an aqueous solution of sugar of identical concentration, heated to boiling and, after such addition, the sugar solution in each kettle was boiled to the same concentration, viz. 63½% sugar content by weight. Thereafter, the jelly batches were promptly poured, without skimming, into clean 6 oz. jelly jars and left to stand overnight.

The next day the five different jelly batches were inspected and tested, with the following results:

| Character of Jelly | pH | Ridgelimeter [1] reading |
|---|---|---|
| #1, firm, excellent | 3.00 | 26.6. |
| #2, so soft could not be turned out | 2.65 | could not be tested. |
| #3, so soft could not be turned out | 2.70 | Do. |
| #4, so soft could not be turned out | 2.55 | Do. |
| #5, soft, unsatisfactory | 3.20 | 34.0. |

[1] The ridgelimeter is a device for measuring the sag in a jelly after it has been turned out of the 6 oz. jelly jar and stood for 30 seconds on a glass slab. The greater the reading, the greater the amount of sag, or slumping, of the jelly, and, therefore, the less firm the jelly. Texture was noted by pinching a chunk of the jelly between the thumb and forefinger.

The only one of the five samples that made a firm, well textured, satisfactory jelly under the test conditions above specified was sample No. 1, the composition of our present invention. This was the only sample of a dry pectin composition that went completely into solution in the small amount of hot plain water to which it was added prior to addition to the hot sugar solution. All three of the other dry pectin compositions failed to go completely into solution, as was evidenced by the fact that the films on the walls of the beakers remained pebbly after stirring for more than five minutes and the solutions that were formed failed to "string" when poured slowly.

The only sample of liquid pectin, sample No. 5, gave a soft, unsatisfactory jelly. This, presumably, was due to deterioration in jelly grade subsequent to its manufacture, although the sample had just been purchased on the open market. Except for such deterioration, sample No. 5 would have produced just as good a jelly as our composition. In fact, except for its tendency to deteriorate during storage before use, a commercial liquid pectin such as sample No. 5, is just as effective when used according to directions in the making of jelly as is our composition. The added advantage of our composition, from a jelly making standpoint, is that it is made up each time into a fresh solution by the housewife, or other operator, just before it is to be used, so cannot be less than its specified jelly grade. It does not appreciably deteriorate in its dry packaged state.

The reason that the other three samples of dry pectin compositions did not give satisfactory jellies, as above stated, is that they did not completely dissolve. This was because these pectin samples had such a high sugar, or total solids content, that they could not be dissolved in the relatively small quantities of water to which they were added. Although the amounts of water in all cases were the same, or the equivalent on the basis of jelly grades, samples Nos. 2, 3 and 4 are contained sufficient amounts of sugar, or solids, in their compositions to bring the sugar, or solids content of their solutions in the 5¼ or 5½ fluid oz. of water to above 28% by weight. In such sugar concentrations none of these samples of dry pectin compositions would dissolve.

Sample No. 1, our composition, however, gave a total solids content when added to 8 fluid oz. of water of only 6% by weight, so it could be dissolved readily and completely. Even our composition, however, could not have been completely dissolved if it had been added to a solution of sugar containing 28% or over of sugar, and this we have positively demonstrated. Of course, in jelly making practice, the operator using our composition is not confronted with this inability of the pectin to go into solution in a sugar solution above a certain concentration, since the directions for its use specifically state to dissolve the ½ oz. package in 8 fluid oz. of hot plain water first, before adding the pectin to the jelly batch. Once, dissolved, the pectin cannot fail to make a good firm jelly if the proportions of sugar are properly adjusted prior to pouring the batch.

Thus, our composition differs from any heretofore known dry pectin compositions in the following respects:

1. Our pectin is non-water soluble, is porous, is at least 200 jelly grade and is coarser than 100 mesh so that it disperses readily as individual discrete particles when it is stirred into water, either hot or cold.

2. Our composition is complete in itself, except for sugar, for jelly making purposes, in that it contains a sufficient amount of a solubilizing agent, sodium citrate, or its equivalent, to dissolve the pectin, and a sufficient amount of tartaric acid, or equivalent organic oxy acid, to effect jelling when the proper amount of sugar is present.

3. Or composition is of such high jelly grade, 50 or higher, and contains such a small proportion of sugar, if any, that ½ oz. of the composition, equivalent to 50 jelly grade or higher, will readily dissolve in 8 fluid oz. of hot plain water because even with a composition of only 50 jelly grade, 1 oz. dissolved in 8 fluid oz. of water gives a sugar, or total solids, content of not over about 10%.

Our composition when made from citrus pectin, represents the first citrus pectin ever to be made up into a water solution of such high jelly grade containing such a small proportion of sugar, or total solids, to pectin. Previous dry compositions of citrus pectin like sample No. 3 in the foregoing test, contained 8.5%—100 grade pectin, 4.25% citric acid and 87.25%—dextrose. Such a composition could not be dissolved to give a solution of a jelly grade comparable to ours because of its high dextrose content, but in the way in which such previous composition was used, the high percentage of dextrose (sugar) exerted no deterrent effect toward its dissolution because the composition was never first dissolved in a small quantity of hot water but was always added to the larger jelly making batch, containing fruit, fruit juices or flavoring matter, before the sugar itself was added. The alkali metal salts, such as sodium citrate, tartrate or the like, in the fruit juice aided dissolution of the pectin under those conditions. Our pectin composition neither requires sugar for its dispersion nor the aid of fruit salts in the jelly batch for its solution, but is invariably dissolved completely in plain water before being added to the jelly batch.

We claim as our invention:

1. A jelly making composition, comprising a dry, granular, non-caking mixture of a non-water soluble pectin, produced by precipitation as a complex of a polyvalent metal, said pectin being of a particle size between 10 and 100 mesh, an edible alkali metal salt of an organic oxy acid in granular form in an amount sufficient by itself to effect complete solution of said pectin content in plain water, and tartaric acid in granular form in an amount sufficient to impart to a water solution of said mixture a pH between 2.2 and 4.0, said dry mixture as a whole having a jelly grade of between 50 and 150 and being readily dispersible with stirring in hot water to dissolve within five minutes without at any time forming lumps containing dry particles in the interior thereof and after being dissolved being capable without the addition of any further ingredients of jelling an aqueous solution of sugar when the resulting sugar-mixture solution contains at least 65% of sugar by weight.

2. A jelly making composition, comprising a dry, granular admixture of a non-water soluble pectin, produced by precipitation as a complex of a polyvalent metal, said pectin being of a particle size such that the pectin particles sink and are readily dispersed when stirred into hot water and do not at any time form lumps containing dry pectin in the interior thereof, an amount in granular form of an edible alkali metal salt of an organic oxy acid sufficient to effect complete solution of all of said pectin content in plain water, and an amount in granular form of tartaric acid sufficient to impart a pH of between 2.2 and 4.0 to a water solution of said admixture, said dry admixture as a whole having a jelly grade of between 50 and 150 and being readily dispersible when stirred into hot water to dissolve completely therein within five minutes and the resulting water solution of said admixture being capable without further ingredients being added thereto of jelling from 50 to 150 parts of sugar in an aqueous mixed solution of said sugar and of said admixture when the sugar content reaches 65% by weight of said mixed solution regardless of whether said water solution of said admixture is added to the water in which said sugar is to be dissolved before or after said sugar has been dissolved therein.

3. A jelly making composition in the form of a dry granular admixture that is non-caking when stored under non-hermetically sealed conditions, 100 parts by weight of said admixture consisting essentially of non-water soluble pectin produced by precipitation as a pectin-aluminum complex and being of at least 200 grade and of a particle size between 30 and 80 mesh, at least the equivalent of 5 parts by weight of sodium citrate in granular form, at least 15 parts by weight of tartaric acid and only a sufficient quantity of an inert material to give said admixture a pectin grade of between 50 and 150, said dry admixture being readily dispersible when stirred into hot water to dissolve completely therein within five minutes and the resulting aqueous solution of said admixture being capable of itself without the addition of any further ingredients of jelling an amount of sugar equivalent to from 50 to 150 times the weight of said dry admixture.

4. A jelly making composition prepared from a dry granular mixture of non-water soluble pectin produced by precipitation as a pectin-aluminum complex and being of at least 200 grade jelly strength, an edible alkali metal salt of an organic oxy acid in sufficient amount to dissolve said pectin and a free organic oxy acid in an amount sufficient to impart to a solution of the mixture a pH between 2.2 and 4.0, said composition comprising a solution of said mixture in plain water in the proportion of one-half ounce of said mixture to 8 fluid ounces of water, 8 fluid ounces of said solution being capable without the addition of any further ingredients of jelling from 25 to 75 ounces of sugar in an aqueous batch containing said sugar in at least 65% concentration and of forming a firm jelly whether said solution is added before or after the sugar to the batch from which the jelly is to be made.

References Cited in the file of this patent
UNITED STATES PATENTS

| | | |
|---|---|---|
| 2,233,574 | Baker et al. | Mar. 4, 1941 |
| 2,334,281 | Olsen et al. | Nov. 16, 1943 |
| 2,392,854 | Leo et al. | Jan. 15, 1946 |

FOREIGN PATENTS

| | | |
|---|---|---|
| 359,728 | Great Britain | Oct. 29, 1931 |